US010871666B2

(12) United States Patent
Saitoh et al.

(10) Patent No.: US 10,871,666 B2
(45) Date of Patent: Dec. 22, 2020

(54) DISPLAY DEVICE COMPRISING A VIEWING ANGLE SWITCHING ELEMENT HAVING A FIRST LINEAR POLARIZER, AN OPTICALLY ANISOTROPIC LAYER, A VIEWING ANGLE CONTROL CELL, AND A SECOND LINEAR POLARIZER

(71) Applicant: FUJIFILM CORPORATION, Tokyo (JP)

(72) Inventors: Yukito Saitoh, Kanagawa (JP); Hiroshi Sato, Kanagawa (JP); Naoyoshi Yamada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/880,997

(22) Filed: May 22, 2020

(65) Prior Publication Data

US 2020/0285108 A1    Sep. 10, 2020

Related U.S. Application Data

(63) Continuation of application No. PCT/JP2018/042895, filed on Nov. 20, 2018.

(30) Foreign Application Priority Data

Nov. 27, 2017 (JP) .................................. 2017-227036

(51) Int. Cl.
*G02F 1/13*    (2006.01)
*G02F 1/1335*    (2006.01)
(Continued)

(52) U.S. Cl.
CPC .............. *G02F 1/1323* (2013.01); *G02F 1/13* (2013.01); *G02F 1/1335* (2013.01);
(Continued)

(58) Field of Classification Search
CPC ............................ G02F 1/1323; G02F 1/1347
See application file for complete search history.

(56) References Cited

U.S. PATENT DOCUMENTS 10,649,248 B1 *   5/2020  Fan Jiang ......... G02F 1/133606
2007/0146608 A1   6/2007  Jin et al.
(Continued)

FOREIGN PATENT DOCUMENTS

EP      2390717 A1      11/2011
JP      2004-279866 A   10/2004
(Continued)

OTHER PUBLICATIONS

International Search Report issued in International Application No. PCT/JP2018/042895 dated Feb. 19, 2019.
(Continued)

*Primary Examiner* — Paul C Lee
(74) *Attorney, Agent, or Firm* — Solaris Intellectual Property Group, PLLC (57) ABSTRACT

A display device includes an image display panel, and a viewing angle switching element includes a first linear polarizer, an optically anisotropic layer, a viewing angle control cell, and a second linear polarizer, in which an angle formed between transmission axes of the first linear polarizer and the second linear polarizer is 45°, the optically anisotropic layer has a function of changing an azimuth of a polarization axis of linearly polarized light emitted from the first linear polarizer and causing the light to be emitted toward the viewing angle control cell, the viewing angle control cell is formed of a vertically aligned liquid crystal cell in which vertically aligned liquid crystals are tilted in one direction by voltage application, and an angle formed between a tilt azimuth of the vertically aligned liquid crystal (Continued)

of the viewing angle control cell and the transmission axis of the second linear polarizer is 45°.

8 Claims, 7 Drawing Sheets

(51) Int. Cl.
    *G02F 1/1337*     (2006.01)
    *G02F 1/1347*     (2006.01)
    *G02F 1/13363*     (2006.01)

(52) U.S. Cl.
    CPC .......... *G02F 1/1337* (2013.01); *G02F 1/1347* (2013.01); *G02F 1/13363* (2013.01); *G02F 1/133528* (2013.01)

(56) References Cited

U.S. PATENT DOCUMENTS

| | | | |
|---|---|---|---|
| 2008/0117364 A1* | 5/2008 | Matsushima | G02F 1/1323 349/96 |
| 2009/0174843 A1 | 7/2009 | Sakai et al. | |
| 2010/0128200 A1 | 5/2010 | Morishita et al. | |
| 2014/0226093 A1* | 8/2014 | Schwartz | G02F 1/13476 349/12 |
| 2015/0301400 A1* | 10/2015 | Kimura | G02B 30/00 349/43 |
| 2016/0357046 A1* | 12/2016 | Choi | G02B 6/005 |
| 2017/0219859 A1* | 8/2017 | Christophy | G02F 1/29 |
| 2018/0239214 A1* | 8/2018 | Ji | G02F 1/0126 |

FOREIGN PATENT DOCUMENTS

| | | |
|---|---|---|
| JP | 2007-178979 A | 7/2007 |
| JP | 2009-20293 A | 1/2009 |
| JP | 2011-248114 A | 12/2011 |
| WO | 2008/004361 A1 | 1/2008 |
| WO | 2008/018212 A1 | 2/2008 |
| WO | 2018/221413 A1 | 12/2018 |

OTHER PUBLICATIONS

Written Opinion of the ISA issued in International Application No. PCT/JP2018/042895 dated Feb. 19, 2019.

\* cited by examiner

DISPLAY DEVICE COMPRISING A VIEWING ANGLE SWITCHING ELEMENT HAVING A FIRST LINEAR POLARIZER, AN OPTICALLY ANISOTROPIC LAYER, A VIEWING ANGLE CONTROL CELL, AND A SECOND LINEAR POLARIZER

CROSS-REFERENCE TO RELATED APPLICATIONS

This application is a continuation application of International Application No. PCT/JP2018/042895, filed Nov. 20, 2018, the disclosure of which is incorporated herein by reference in its entirety. Further, this application claims priority from Japanese Patent Application No. 2017-227036, filed Nov. 27, 2017, the disclosure of which is incorporated herein by reference in its entirety.

BACKGROUND OF THE INVENTION

1. Field of the Invention

The present disclosure relates to a display device such as a liquid crystal display device or an organic electroluminescent display device, and particularly relates to a display device capable of controlling a viewing angle.

2. Description of the Related Art

In electronic devices for personal use such as a tablet personal computer (PC), a laptop PC, and a mobile phone such as a smartphone, there is a demand for preventing a screen from being peeped by a peripheral third party. Therefore, in these electronic devices, the viewing angle of the screen is narrowed so that the screen is not to be peeped by a peripheral third party. In addition, in information displays for public use, displays mounted on cars, trains and aircrafts, and industrial displays for medical and factory equipment and the like, there has been an increasing demand for widening a viewing angle in a certain direction and narrowing a viewing angle in a certain direction.

As a method of narrowing the viewing angle of a screen, a method of bonding a film in which black stripes are formed (louver film) or the like to a screen has been known.

However, in this method, the screen is fixed in a state in which the viewing angle of the screen is narrow. Therefore, for example, in a case where a screen is needed to be visually recognized in an oblique direction, such as a case where several persons visually recognize a screen, the visibility in the oblique direction is deteriorated and the usability of electronic devices is deteriorated.

In order to solve such problems, in electronic devices such as a tablet PC and a laptop PC, various display devices capable of switching between a display at a wide viewing angle and a display at a narrow viewing angle to realize security such as prevention of a peep from the side and if necessary, sufficient visibility from the side have been proposed.

For example, JP2007-178979A (hereinafter, also referred to as Patent Document 1) discloses a liquid crystal display device including a first substrate having gate wirings and data wirings corresponding to subpixels of red (R), green (G), blue (B), and white (W), a thin film transistor arranged at each crossing points of the gate wirings and the data wirings, a plate type first common electrode disposed in the subpixels of R, G, B, and W, a pixel electrode having a plurality of slits, connected to the thin film transistor and insulated from the first common electrode, a second substrate bonded to face the first substrate and including a liquid crystal layer in a space between the second substrate and the first substrate, and a plate type second common electrode formed on the second substrate so as to correspond to each W subpixel.

In this liquid crystal display device, in a case of a wide viewing angle display, the viewing angle can be widened by driving the W subpixel in a fringe field switching (FFS) mode like adjacent subpixels of R, G, and B, and the brightness of W can also be compensated, and in a case of a narrow viewing angle display, the viewing angle can be narrowed by driving the W subpixel in an electrically controlled birefringence (ECB) mode forming a vertical electric field unlike subpixels adjacent to R, G, and B.

JP2004-279866A (hereinafter, also referred to as Patent Document 2) discloses a display device including a screen having a viewing angle limited in a one-dimensional direction, and image display switching means for switching between a personal view mode in which an erection direction of an image displayed on the screen is approximately orthogonal to the viewing angle limiting direction and a multi-view mode in which the erection direction of the image coincides with the viewing angle limiting direction.

That is, in this display device, depending on whether or not the viewing angle of the screen is limited in the one-dimensional direction by using a microprism sheet or the like, and the top and the bottom of the image are made to coincide with the viewing angle limiting direction by rotating the image by 90°, a wide viewing angle display and a narrow viewing angle display can be switched.

SUMMARY OF THE INVENTION

According to these display devices, display visual recognition in a state in which a peep of a third party from the side can be prevented and appropriate display visual recognition for several persons can be achieved with one display device by switching between a wide viewing angle display and a narrow viewing angle display.

However, in the display devices disclosed in Patent Documents 1 and 2, it is not possible to perform switching between a wide viewing angle display and a narrow viewing angle display only in facing two directions, for example, in the lateral direction. That is, in the method of the related art, it is difficult to switch the viewing angle only in one direction with a simple configuration.

An object of the present disclosure is to solve such problems of the related art and to provide a display device capable of performing switching between a wide viewing angle display and a narrow viewing angle display with a limited viewing angle only in a certain direction with a simple configuration.

A display device according to the present disclosure is a display device comprising: an image display panel; and a viewing angle switching element that is arranged on a display surface side of the image display panel and changes a viewing angle, in which the viewing angle switching element includes a
  first linear polarizer, an optically anisotropic layer, a
  viewing angle control cell, and a second linear polarizer
  arranged in order from an image display panel side,
an angle formed between transmission axes of the first linear
  polarizer and the second linear polarizer is 45°,
the optically anisotropic layer has a function of changing an
  azimuth of a polarization axis of linearly polarized light
  emitted from the first linear polarizer to an azimuth forming an angle of 45° with the azimuth of the polarization axis and causing the light to be emitted toward the viewing angle control cell, the viewing angle control cell is formed of a vertically aligned liquid crystal cell in which vertically aligned liquid crystals are tilted in one direction by voltage application, and an angle formed between a tilt azimuth of the vertically aligned liquid crystal of the viewing angle control cell and the transmission axis of the second linear polarizer is 45°.

In the display device according to the present disclosure, the optically anisotropic layer may change the polarization axis of linearly polarized light emitted from the first linear polarizer to an azimuth orthogonal to the transmission axis of the second linear polarizer to cause the light to be emitted toward the viewing angle control cell, and the viewing angle switching element may change the viewing angle in the tilt azimuth of the vertically aligned liquid crystal of the viewing angle control cell.

In this case, the viewing angle may be changed by switching an alignment state of the vertically aligned liquid crystal of the vertically aligned liquid crystal cell between an oblique alignment in which the liquid crystal is obliquely tilted in the tilt azimuth and a horizontal alignment with a polar angle of 90°.

In the display device according to the present disclosure, the optically anisotropic layer may change the polarization axis of linearly polarized light emitted from the first linear polarizer to an azimuth parallel to the transmission axis of the second linear polarizer to cause the light to be emitted toward the viewing angle control cell, and the viewing angle switching element may change the viewing angle in an azimuth that forms 180° with the tilt azimuth of the vertically aligned liquid crystal of the viewing angle control cell.

In this case, the viewing angle may be changed by switching an alignment state of the vertically aligned liquid crystal of the vertically aligned liquid crystal cell between a vertical alignment with a polar angle of 0° and an oblique alignment in which the liquid crystal is obliquely tilted in the tilt azimuth.

In the display device of the present disclosure, the optically anisotropic layer may be a $\lambda/2$ plate.

In the display device of the present disclosure, the optically anisotropic layer may be a film that rotates the polarization axis of the linearly polarized light emitted from the first linear polarizer by 45° to cause the light to be emitted toward the viewing angle control cell.

In the display device according to the present disclosure, the image display panel may include a liquid crystal cell for display, and two linear polarizers that are arranged to face to each other with the liquid crystal cell for display interposed therebetween, and one of the two linear polarizers may function as the first linear polarizer of the viewing angle switching element.

The display device according to the present disclosure is a display device comprising an image display panel, and a viewing angle switching element that is arranged on a display surface side of the image display panel and changes a viewing angle, in which the viewing angle switching element includes a first linear polarizer, an optically anisotropic layer, a viewing angle control cell, and a second linear polarizer arranged in order from an image display panel side, an angle formed between transmission axes of the first linear polarizer and the second linear polarizer is 45°, the optically anisotropic layer has a function of changing an azimuth of a polarization axis of linearly polarized light emitted from the first linear polarizer to an azimuth forming an angle of 45° with the azimuth of the polarization axis and causing the light to be emitted toward the viewing angle control cell, the viewing angle control cell is formed of a vertically aligned liquid crystal cell in which vertically aligned liquid crystals are tilted in one direction by voltage application, and an angle formed between a tilt azimuth of the vertically aligned liquid crystal of the viewing angle control cell and the transmission axis of the second linear polarizer is 45°. With this configuration, it is possible to switch between a wide viewing angle display and a narrow viewing angle display with a limited viewing angle only in a certain direction with a simple configuration.

DESCRIPTION OF THE PREFERRED EMBODIMENTS

Hereinafter, embodiments of a display device according to the present invention will be described with reference to drawings. In each drawing, the scale of each constituent element is appropriately changed from the actual one in order to facilitate visual recognition. The numerical range expressed using "to" in the present specification includes numerical values described before and after "to" as the lower limit value and the upper limit value. In addition, regarding the angle, the terms "orthogonal" and "parallel" means a range of an exact angle ±10°. The angles defined by other numerical values may be deviated from the exact angle in a range in which a desired function is achieved.

Display Device of First Embodiment

Figure 1:
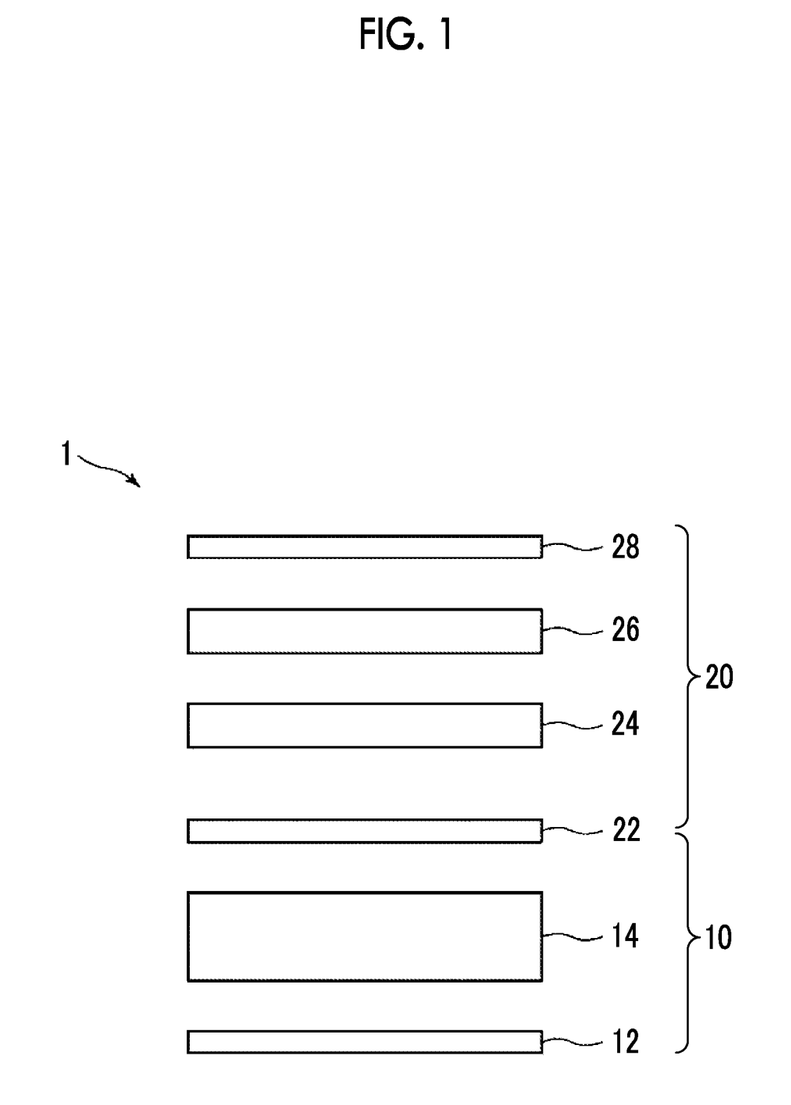
FIG. 1 is a view showing a schematic configuration of a display device according to a first embodiment.

FIG. 1 is a view showing a schematic configuration of a display device 1 according to a first embodiment. As shown in FIG. 1, a display device 1 according to a first embodiment includes an image display panel 10, and a viewing angle switching element 20 that is arranged on the display surface side of the image display panel.

In the embodiment, the image display panel 10 is a liquid crystal display (LCD) and includes two linear polarizers 12 and 22 of which the transmission axes are orthogonal to each other, and a liquid crystal cell for display 14 that is arranged between the pair of linear polarizers 12 and 22. The viewing angle switching element 20 includes two linear polarizers 22 and 28 of which the transmission axes form an angle of 45°, and an optically anisotropic layer 24 and a viewing angle control cell 26 that are arranged between the two linear polarizers 22 and 28 in a laminated manner. In the embodiment, the linear polarizer 22 that is arranged on the visible side (display surface side) of the image display panel 10 functions as a first linear polarizer of the viewing angle switching element 20. In the description of the viewing angle switching element 20 below, the linear polarizer 22 on the visible side of the image display panel 10 is referred to as a first linear polarizer 22. In addition, the linear polarizer 28 on the other side of the viewing angle switching element 20 is referred to as a second linear polarizer 28.

Hereinafter, a case where the linear polarizer is an absorption type polarizer will be described. In a case where a reflection type polarizer is used as the linear polarizer, the absorption axis may be replaced with a reflection axis and the same effect as in a case of an absorption type polarizer described later is exhibited. Note that the absorption axis or the reflection axis is orthogonal to the transmission axis.

Here, typically, the polarizer is provided as a polarizing plate including a protective film on one surface or both surfaces of the polarizer. Hereinafter, the polarizer may be replaced with a polarizing plate.

The viewing angle switching element 20 emits the light from the liquid crystal cell for display 14 as linearly polarized light from the first linear polarizer 22, and imparts a polarization change to the linearly polarized light emitted from the first linear polarizer 22 to emit the light from the second linear polarizer 28. The viewing angle switching element 20 has a configuration in which the voltage applied to the viewing angle control cell 26 can be switched from an initial value (OFF state) to a predetermined value (ON state). Here, the initial value of the applied voltage refers to a voltage value in a case where the viewing angle is a uniformly wide viewing angle when light passes through the viewing angle control cell 26 and is not limited to 0 V. The OFF state of the viewing angle switching element 20 corresponds to a state in which the viewing angle is a wide viewing angle, and the ON state corresponds to a state in which the viewing angle is a narrow viewing angle.

The viewing angle control cell 26 is formed of a vertically aligned liquid crystal cell of a vertical alignment (VA) type having negative dielectric anisotropy in which vertically aligned liquid crystals are tilted in one direction by voltage application. In the viewing angle control cell 26, when no voltage is applied, the rod-like liquid crystal molecules are approximately vertically aligned, and when a voltage is applied, the major axes of the liquid crystal molecules fall uniformly in a tilt direction of the tilt angle (specific one direction). In the present specification, the in-plane azimuth of the specific one direction in which the liquid crystal molecules fall uniformly is referred to as a tilt azimuth. The tilt of the liquid crystal molecules in the tilt azimuth can be controlled by changing the applied voltage.

The absorption axis of the linear polarizer provided on the visible side surface of an LCD of the related art is generally in the lateral direction (azimuthal angle 0° to 180°) or vertical direction (azimuthal angle 90° to 270°) of the screen in a case where the screen is viewed from the front. At this time, in a case where the tilt azimuth of the viewing angle control cell 26 coincides with the lateral direction, the direction in which the liquid crystal molecules fall by voltage application is parallel or orthogonal to the absorption axis of the linear polarizer, and thus there is no change in the polarization of passing light. On the other hand, in the embodiment, the tilt azimuth of the viewing angle control cell 26 is set to the azimuth at an angle of 45° from the transmission axis of the second linear polarizer. Therefore, a difference between the polarization change in a predetermined direction and the polarization change in the directions other than the predetermined direction is generated by the viewing angle control cell 26, so that viewing angle switching can be realized only in one specified direction.

The viewing angle switching element 20 is arranged such that the transmission axes of the first linear polarizer 22 and the second linear polarizer 28 form an angle of 45°.

The optically anisotropic layer 24 has a function of changing the polarization axis of the linearly polarized light emitted from the first linear polarizer 22 by 45°. Accordingly, the polarization axis of the linearly polarized light emitted from the optically anisotropic layer 24 is in a direction orthogonal or parallel to the transmission axis of the second linear polarizer 28. In the present embodiment, the optically anisotropic layer 24 is constituted by a λ/2 plate. Hereinafter, the optically anisotropic layer is also referred to as a λ/2 plate 24. The λ/2 plate 24 changes the polarization axis of the incident linearly polarized light to an azimuth axisymmetric with respect to the slow axis and emits the light. The azimuth of the slow axis of the λ/2 plate 24 is set such that an angle formed between the azimuth of the polarization axis after the conversion and the azimuth of the polarization axis before the conversion in the λ/2 plate 24 is 45°.

As the λ/2 plate, known λ/2 plates can be used.

In a case where the polarization axis of the linearly polarized light emitted from the optically anisotropic layer 24 is orthogonal to the transmission axis of the second linear polarizer 28, the ON/OFF switching by the viewing angle control cell 26 is as follows.

In a case where the voltage applied to the viewing angle control cell 26 has an initial value (OFF state), the viewing angle control cell 26 causes a polarization change to change the phase of passing light in all directions by 90° or nearly 90°. On the other hand, in a case where the voltage applied to the viewing angle control cell 26 has a predetermined value (ON state), the viewing angle control cell causes almost no polarization change for passing light in a predetermined direction, and causes a polarization change to change the phase of the light by 90° or near 90° in directions other than the predetermined direction.

In a case where the polarization axis of the linearly polarized light emitted from the optically anisotropic layer 24 is parallel to the transmission axis of the second linear polarizer 28, the ON/OFF switching by the viewing angle control cell 26 is as follows.

In a case where the voltage applied to the viewing angle control cell 26 has an initial value (OFF state), the viewing angle control cell 26 does not change the phase of passing light in all directions or a change in the phase is small. On the other hand, in a case where the voltage applied to the viewing angle control cell 26 has a predetermined value (ON state), the viewing angle control cell 26 causes a polarization change to change the phase of passing light by 90° in a predetermined direction and does not change the phase in directions other than the predetermined direction or a change in the phase is small.

The display device 1 can display an image with the viewing angle changed from a wide viewing angle to a narrow viewing angle only in one direction by the ON and OFF control of the viewing angle control cell 26, that is, by the ON and OFF control of the viewing angle switching element 20.

Figure 2:
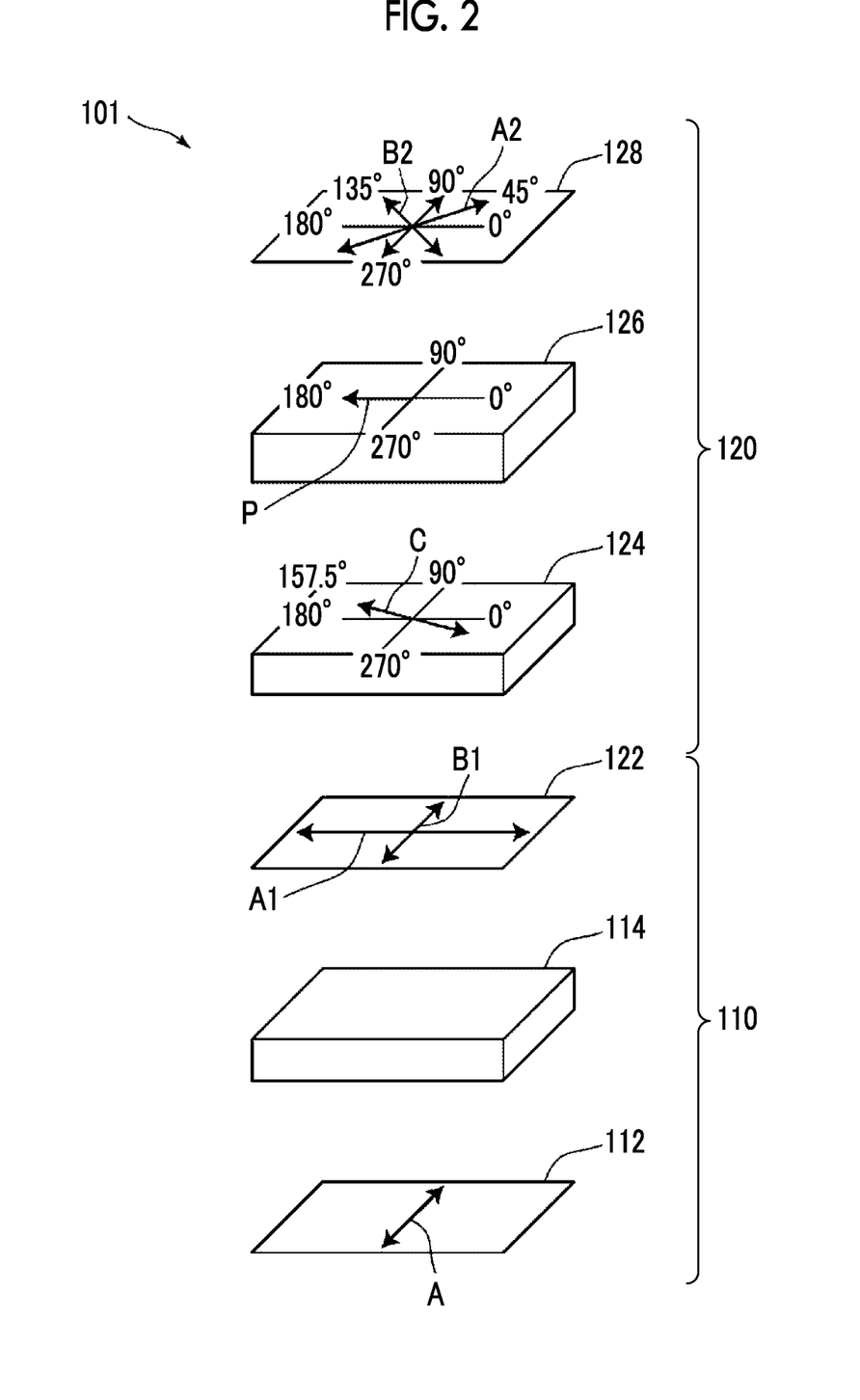
FIG. 2 is a perspective view showing a schematic configuration of a display device 101 of configuration example 1 according to the first embodiment.
Figure 3:
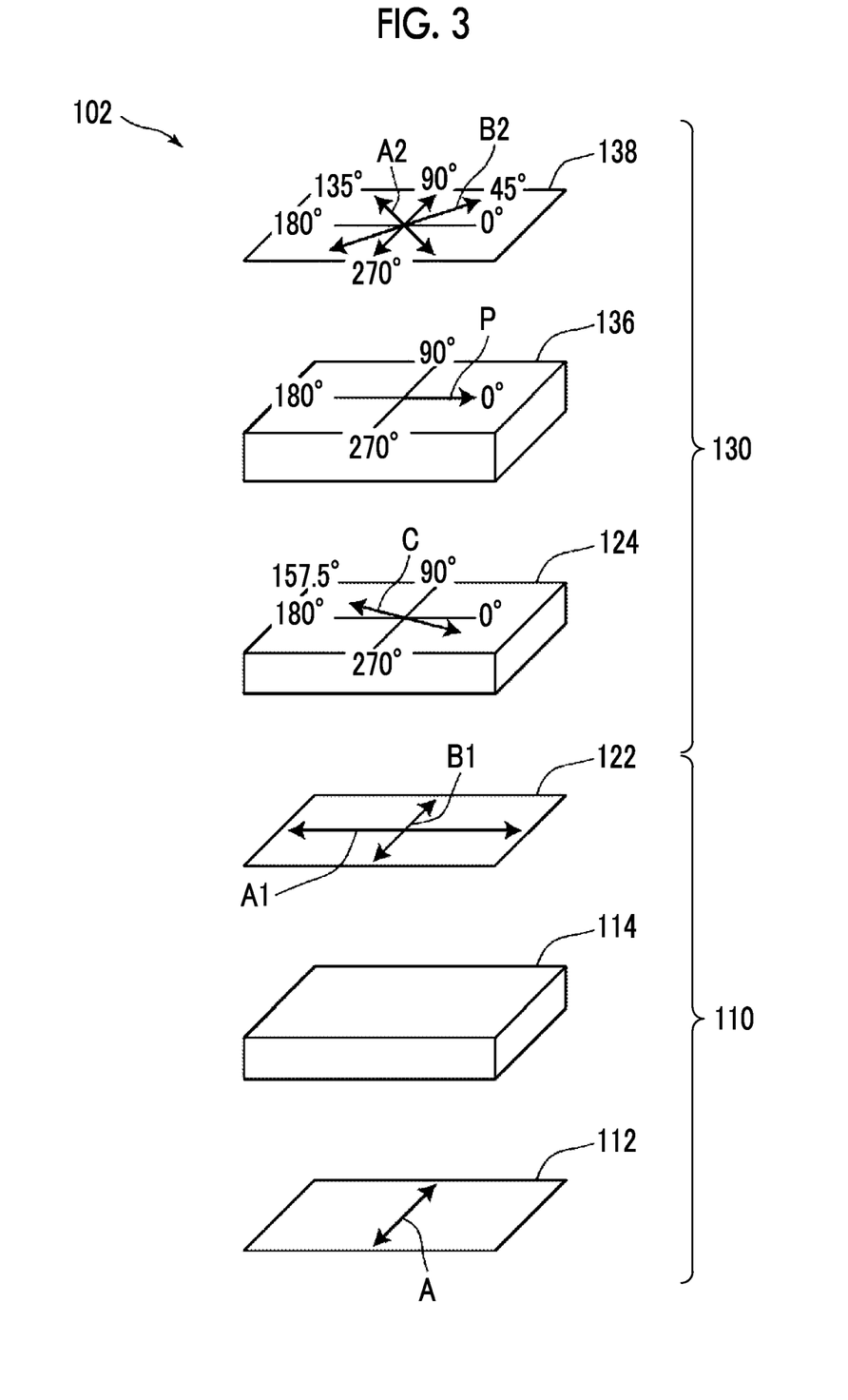
FIG. 3 is a perspective view showing a schematic configuration of a display device 102 of configuration example 2 according to the first embodiment.

Hereinafter, more specific configuration examples of the display device according to the first embodiment will be described with reference to FIGS. 2 and 3. In FIGS. 2 and 3, elements equivalent to each element of the display device 1 of the first embodiment are denoted by reference numerals obtained by adding 100 or 110.

Configuration Example 1

FIG. 2 is a perspective view showing a schematic configuration of a display device 101 of configuration example 1 according to the first embodiment.

In the display device 101 in FIG. 2, a first linear polarizer 122 and a second linear polarizer 128 are arranged such that absorption axes A1 and A2 thereof form an angle of 45°, that is, transmission axes B1 and B2 thereof form an angle of 45°. In the example, the right direction in the lateral direction in the drawing is defined as an azimuth of 0°, the left direction is defined as an azimuth of 180°, and the absorption axis A1 of the first linear polarizer 122 coincides with the lateral direction. That is, here, the first linear polarizer 122 and the second linear polarizer 128 are arranged such that the transmission axis B1 has an azimuth of 90° and the transmission axis B2 has an azimuth of 135°.

An optically anisotropic layer 124 is a λ/2 plate arranged such that the azimuth of a slow axis C is 157.5°. The λ/2 plate converts the polarization axis of the linearly polarized light emitted from the first linear polarizer 122 into an axis axisymmetric with respect to an axis at an azimuth of 157.5°. Therefore, the linearly polarized light having the polarization axis at an azimuth of 90° and transmitted through the transmission axis at an azimuth of 90° is converted into an azimuth of 225°. The polarization axis at an azimuth of 225° is equivalent to a polarization axis at an azimuth of 45°. The polarization axis of light emitted from the optically anisotropic layer 124 toward the viewing angle control cell is orthogonal to the transmission axis B2 of the second linear polarizer 128.

In the configuration example 1, a viewing angle control cell 126 is arranged such that the tilt azimuth is 180°.

A change in the viewing angle in a case where a viewing angle switching element 120 is turned on and off in a state in which the image display panel displays white will be described.

In a case where a large voltage (for example, 5.0 V) is applied to the viewing angle control cell 126 to make the liquid crystal molecules horizontally fall in the tilt azimuth, in-plane retardation is generated. Since retardation is generated in all azimuths, the polarization state of the linearly polarized light emitted from the first linear polarizer 122 is changed, and the linearly polarized light is transmitted through the transmission axis B2. This state corresponds to an "OFF" state for viewing angle control. In a case where the voltage is lowered from this state to a predetermined value (for example, 3.4 V), the angle at which the liquid crystal molecules fall is decreased (the state of the liquid crystal molecules is changed from a horizontally fallen state to an erected state), and the major axis direction of the liquid crystal molecules is obliquely tilted in the tilt azimuth. Thus, the retardation is smaller in the tilt azimuth than in other azimuths. In the direction in which the retardation is small, the transmittance is lower than in other directions, the state becomes black, and the viewing angle control is an "ON" state. In the configuration example 1, since a tilt azimuth P of the viewing angle control cell is set to 180°, a change in transmittance due to ON/OFF switching becomes the largest at an azimuth of 180°. As a result, switching of the viewing angle at an azimuth of 180° is realized.

In the above description, the transmission axis of the first linear polarizer has an azimuth of 90°, the transmission axis of the second linear polarizer has an azimuth of 135°, the slow axis azimuth of the λ/2 plate is 157.5°, and the tilt azimuth of the viewing angle control cell is 180°. However, the present invention is not limited to the above combination, and other combinations of the transmission axis of the first polarizer, the transmission axis of the second polarizer, the slow axis of the λ/2 plate, and the tilt azimuth of the viewing angle control cell satisfying the requirements of the first embodiment may be adopted. The configuration example 1 and combinations Nos. 1 to 8 of the axial azimuths of each element having the same operation and effect as the configuration example 1 are shown in Table 1.

TABLE 1

| | | First embodiment: Configuration example 1 Combination No. | | | | | | | |
|---|---|---|---|---|---|---|---|---|---|
| | | 1 | 2 | 3 | 4 | 5 | 6 | 7 | 8 |
| Second linear polarizer | Transmission axis azimuth (°) | 135 | 135 | 45 | 45 | 135 | 135 | 45 | 45 |
| Viewing angle control cell | Tilt azimuth (°) | 180 | 180 | 180 | 180 | 180 | 180 | 180 | 180 |
| λ/2 plate | Slow axis azimuth (°) | 157.5 | 67.5 | 22.5 | 112.5 | 157.5 | 67.5 | 22.5 | 112.5 |
| First linear polarizer | Transmission axis azimuth (°) | 90 | 90 | 90 | 90 | 0 | 0 | 0 | 0 |

Configuration Example 2

FIG. 3 is a perspective view showing a schematic configuration of a display device 102 of configuration example 2 according to the first embodiment.

In the display device 102 in FIG. 3, a first linear polarizer 122 and a second linear polarizer 138 are arranged such that absorption axes A1 and A2 thereof form an angle of 45°, that is, transmission axes B1 and B2 thereof form an angle of 45°. In the example, the right direction in the lateral direction in the drawing is defined as an azimuth of 0°, the left direction is defined as an azimuth of 180°, and the absorption axis A1 of the first linear polarizer 122 coincides with the lateral direction. The azimuth of the transmission axis of the second linear polarizer 138 in the configuration example 2 is different from the azimuth of the transmission axis of the second linear polarizer 128 in the configuration example 1 by 90°. That is, here, the first linear polarizer 122 and the second linear polarizer 138 are arranged such that the transmission axis B1 has an azimuth of 90° and the transmission axis B2 has an azimuth of 45°.

The optically anisotropic layer 124 is a λ/2 plate arranged in such a manner that the azimuth of the slow axis C is set to 157.5° as in the configuration example 1. The λ/2 plate converts the polarization axis of the linearly polarized light emitted from the first linear polarizer 122 into an axis axisymmetric with respect to an axis at an azimuth of 157.5°. Therefore, the linearly polarized light having the polarization axis at an azimuth of 90° and transmitted through the transmission axis at an azimuth of 90° is converted into an azimuth of 225°. The polarization axis at an azimuth of 225° is equivalent to a polarization axis at an azimuth of 45°. That is, the polarization axis of the light emitted from the optically anisotropic layer 124 toward the viewing angle control cell is parallel to the transmission axis B2 of the second linear polarizer 138.

In the configuration example 2, the viewing angle control cell 136 is arranged such that the tilt azimuth is 0°.

A change in the viewing angle in a case where a viewing angle switching element 130 is turned on and off in a state in which the image display panel displays white will be described.

In a state in which no voltage is applied to the viewing angle control cell 136 (0 V), the liquid crystal molecules in the viewing angle control cell 136 are substantially vertically aligned. Since the retardation is not generated in the front and the retardation is small even in the oblique direction when the liquid crystal molecules are vertically aligned, the linearly polarized light emitted from the first linear polarizer 122 is not changed and emitted toward the second linear polarizer 138 as linearly polarized light parallel to the transmission axis of the second linear polarizer 138 as it is. This state is an "OFF" state for viewing angle control. In a case where the voltage is increased from this state to a predetermined value (for example, 3.0 V), the major axis direction of the liquid crystal molecules falls in the tilt azimuth and obliquely tilted, and thus the retardation is larger in an azimuth forming an angle of 180° with the tilt azimuth than in other azimuths. In the direction in which the retardation is large, the transmittance is lower than in the other directions, resulting in a black state, and the viewing angle control is an "ON" state. Since the tilt azimuth P of the viewing angle control cell is set to 180° in the configuration example 2, a change in transmittance due to ON/OFF switching becomes the largest at an azimuth of 180°. As a result, switching of the viewing angle at an azimuth of 180° is realized.

Figure 4:
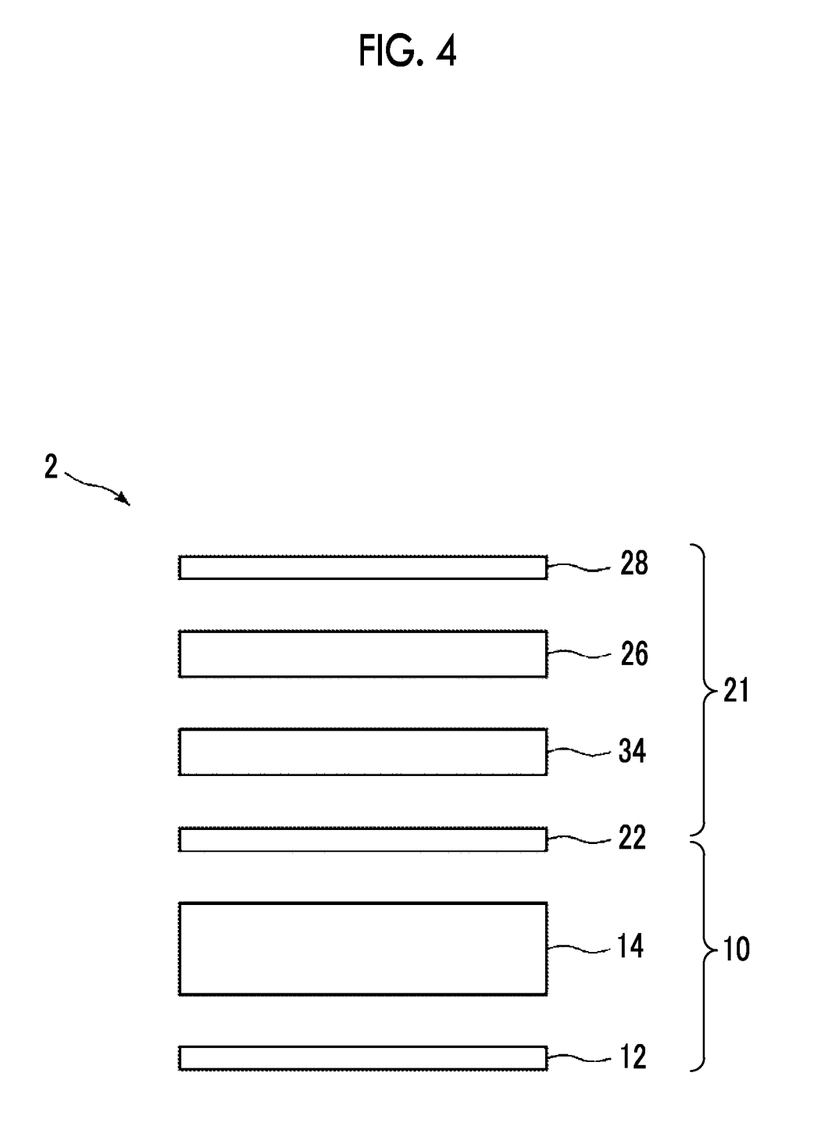
FIG. 4 is a view showing a schematic configuration of a display device according to a second embodiment.

In the above description, the transmission axis of the first linear polarizer has an azimuth of 90°, the transmission axis of the second linear polarizer has an azimuth of 45°, the slow axis azimuth of the λ/2 plate is 157.5°, and the tilt azimuth of the viewing angle control cell is 0°. However, the present invention is not limited to the above combination, and other combinations of the transmission axis of the first polarizer, the transmission axis of the second polarizer, the slow axis of the λ/2 plate, and the tilt azimuth of the viewing angle control cell satisfying the requirements of the first embodiment may be adopted. The configuration example 2 and combinations Nos. 1 to 8 of the axial azimuths of each element having the same operation and effect as the configuration example 2 are shown in Table 2.

according to a second embodiment includes an image display panel 10, and a viewing angle switching element 21 that is arranged on the display surface side of the image display panel.

The display device 2 according to the second embodiment is different from the display device 1 according to the first embodiment in that an optically anisotropic layer 34 provided in the viewing angle switching element 21 is a film that rotates the polarization axis of linearly polarized light emitted from a first linear polarizer 22 by 45° to cause the light to be emitted toward a viewing angle control cell 26 (hereinafter, also referred to as a twist film 34).

The twist film 34 is formed of a liquid crystal layer, and has 45° twist alignment in which the slow axis of the liquid crystal is rotated by 45° from the light incident surface to the light emission surface. The twist film has a function of rotating the polarization axis of linearly polarized light parallel to the slow axis or the fast axis of the liquid crystal by 45°. The optical rotation direction is appropriately set to a plus direction or a minus direction in relation to the transmission axis of the second linearly polarizer.

Examples of the twist film include those described in JP2017-102259A.

The display device 2 of the embodiment can obtain substantially the same operation and effect as those of the λ/2 plate 24 in the first embodiment by using the twist film 34.

In the above description, the azimuth of the slow axis of the optically anisotropic layer 24 in the viewing angle switching element 20 in the first embodiment can be replaced with the average slow axis azimuth of the liquid crystal in the twist film 34.

The average slow axis azimuth of the liquid crystal is the average azimuth of the azimuths of the slow axis of the liquid crystal on the incident surface (hereinafter, the incident slow axis) and the slow axis of the liquid crystal on the emission surface (hereinafter, the emission slow axis). For example, in a case where the azimuth of the incident slow axis is 180° and the azimuth of the emission slow axis is 135°, the average slow axis azimuth is 157.5°. Here, the incident surface of the twist film 34 is a surface into which light emitted from the first linear polarizer 22 is incident, and the emission surface is a surface on the side close to the viewing angle control cell 26 for emitting light.

Figure 5:
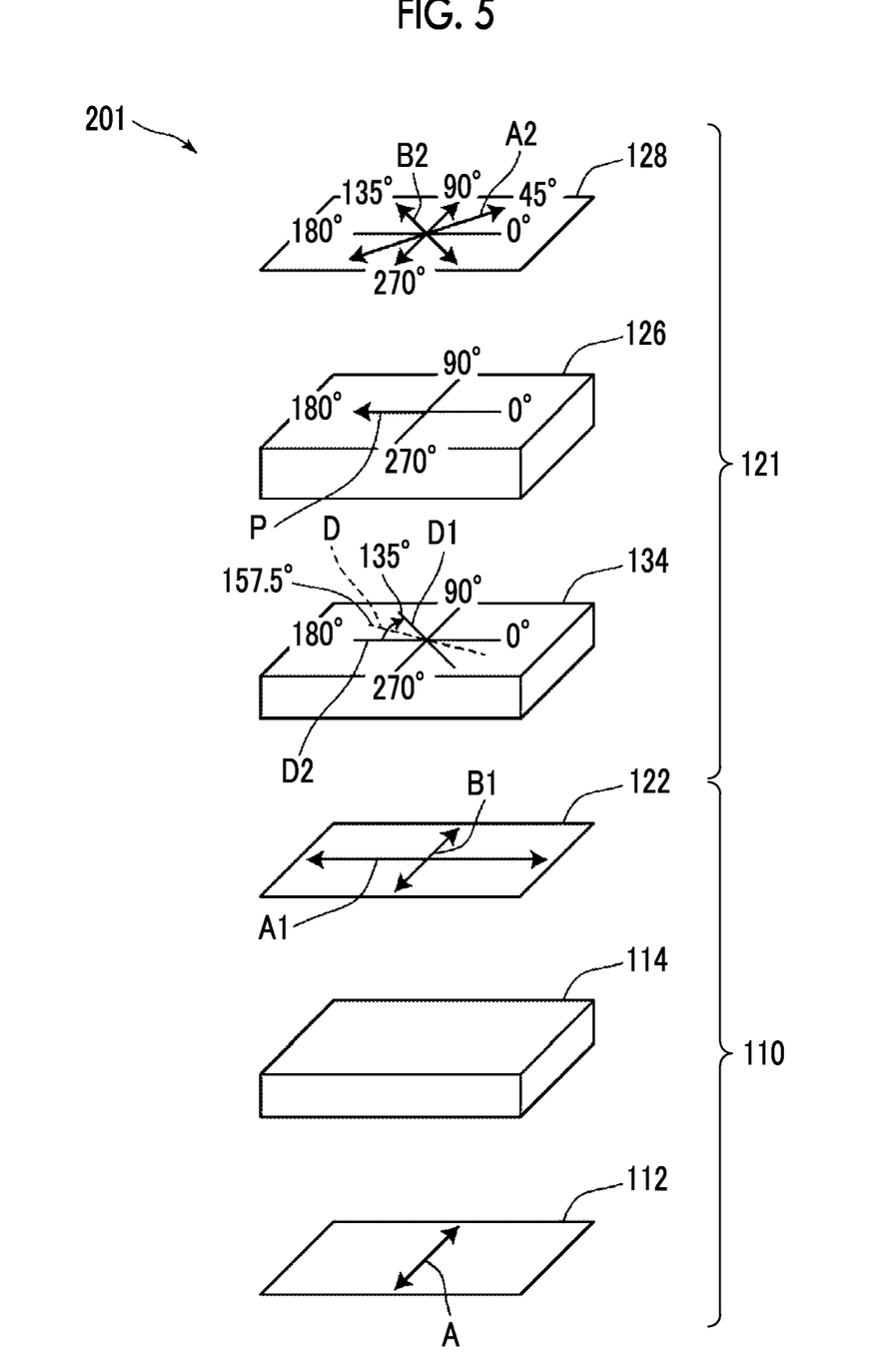
FIG. 5 is a perspective view showing a schematic configuration of a display device 201 of configuration example 1 according to the second embodiment.
Figure 6:
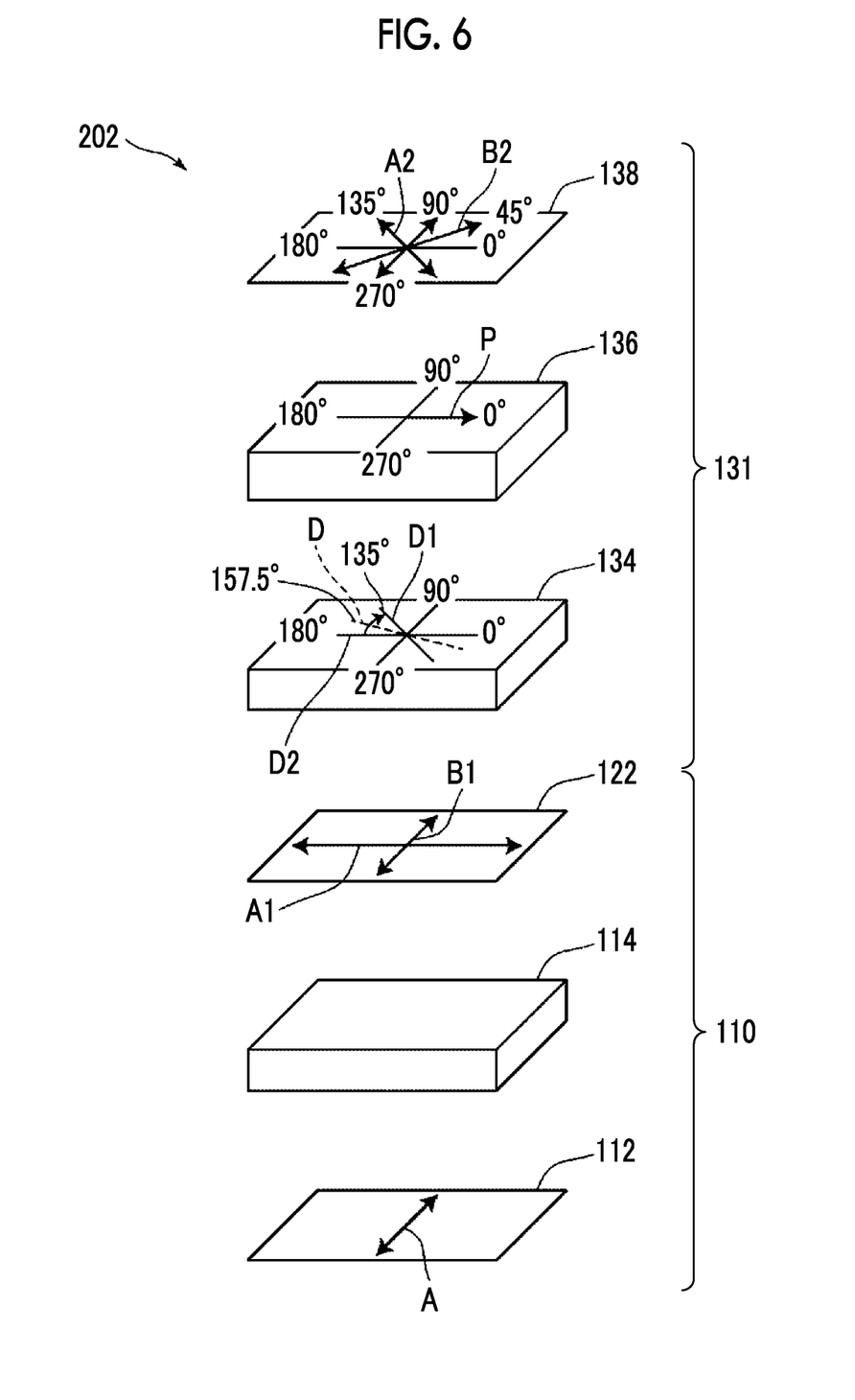
FIG. 6 is a perspective view showing a schematic configuration of a display device 202 of configuration example 2 according to the second embodiment.

Hereinafter, more specific configuration examples of the display device according to the second embodiment will be described with reference to FIGS. 5 and 6. In FIGS. 5 and 6, elements equivalent to each element of the display device

TABLE 2

| | | First embodiment: Configuration example 2 Combination No. | | | | | | | |
|---|---|---|---|---|---|---|---|---|---|
| | | 1 | 2 | 3 | 4 | 5 | 6 | 7 | 8 |
| Second linear polarizer | Transmission axis azimuth (°) | 45 | 45 | 135 | 135 | 45 | 45 | 135 | 135 |
| Viewing angle control cell | Tilt azimuth (°) | 0 | 0 | 0 | 0 | 0 | 0 | 0 | 0 |
| λ/2 plate | Slow axis azimuth (°) | 157.5 | 67.5 | 22.5 | 112.5 | 157.5 | 67.5 | 22.5 | 112.5 |
| First linear polarizer | Transmission axis azimuth (°) | 90 | 90 | 90 | 90 | 0 | 0 | 0 | 0 |

Display Device of Second Embodiment

FIG. 4 is a view showing a schematic configuration of a display device 2 according to a second embodiment. In FIG. 4, the same constituent elements as those of the display device 1 of the first embodiment in FIG. 1 are denoted by the same reference numerals, and detailed description thereof will be omitted. As shown in FIG. 4, a display device 2

2 of the second embodiment shown in FIG. 4 are denoted by reference numerals obtained by adding 100 or 110.

Configuration Example 1

FIG. 5 is a perspective view showing a schematic configuration of a display device 201 of configuration example 1 according to the second embodiment.

In the display device 201 of FIG. 5, a first linear polarizer 122 and a second linear polarizer 128 are arranged such that absorption axes A1 and A2 thereof form an angle of 45°, that is, transmission axes B1 and B2 thereof form an angle of 45°. In the example, the right direction in the lateral direction in the drawing is defined as an azimuth of 0°, the left direction is defined as an azimuth of 180°, and the absorption axis A1 of the first linear polarizer 122 coincides with the lateral direction. That is, here, the first linear polarizer 122 and the second linear polarizer 128 are arranged such that the transmission axis B1 has an azimuth of 90° and the transmission axis B2 has an azimuth of 135°.

An optically anisotropic layer 134 is a twist film in which the azimuth of an incident slow axis D1 is 180°, the azimuth of an emission slow axis D2 is 135°, and the azimuth of an average slow axis D is 157.5°. The twist film 134 rotates the polarization axis of the linearly polarized light emitted from the first linear polarizer 122 by −45°. Accordingly, the linearly polarized light having a polarization axis at an azimuth of 90° and transmitted through the transmission axis at an azimuth of 90° is converted into an azimuth of 45°. That is, the polarization axis of the light emitted from the twist film 134 toward the viewing angle control cell is orthogonal to the transmission axis B2 of the second linear polarizer 128.

In the configuration example 1, a viewing angle control cell 126 is arranged such that the tilt azimuth is 180°.

A change in the viewing angle in a case where a viewing angle switching element 121 is turned on and off in a state in which the image display panel displays white will be described.

In a case where a large voltage (for example, 5.0 V) is applied to the viewing angle control cell 126 to make the liquid crystal molecules horizontally fall in the tilt azimuth, in-plane retardation is generated. Since retardation is generated in all azimuths, the polarization state of the linearly polarized light emitted from the first linear polarizer 122 is changed, and the linearly polarized light is transmitted through the transmission axis B2. This state corresponds to an "OFF" state for viewing angle control. In a case where the voltage is lowered from this state to a predetermined value (for example, 3.4 V), the angle at which the liquid crystal molecules fall is decreased (the state of the liquid crystal molecules is changed from a horizontally fallen state to an erected state), and the major axis direction of the liquid crystal molecules is obliquely tilted in the tilt azimuth. Thus, the retardation is smaller in the tilt azimuth than in other azimuths. In the direction in which the retardation is small, the transmittance is lower than in other directions, the state becomes black, and the viewing angle control is an "ON" state. In the configuration example 1, since a tilt azimuth P of the viewing angle control cell is set to 180°, a change in transmittance due to ON/OFF switching becomes the largest at an azimuth of 180°. As a result, switching of the viewing angle at an azimuth of 180° is realized.

In the above description, the transmission axis of the first linear polarizer has an azimuth of 90°, the transmission axis of the second linear polarizer has an azimuth of 135°, the average slow axis azimuth of the twist film is 157.5°, and the tilt azimuth of the viewing angle control cell is 180°. However, the present invention is not limited to the above combination, and other combinations of the transmission axis of the first polarizer, the transmission axis of the second polarizer, the incident slow axis and the emission slow axis of the twist film, and the tilt azimuth of the viewing angle control cell satisfying the requirements of the second embodiment may be adopted. The configuration example 1 and combinations Nos. 1 to 8 of the axial azimuths of each element having the same operation and effect as the configuration example 1 are shown in Table 3. Twist films of Nos. 1, 2, 5 and 6 rotate the polarization axis of linearly polarized light by −45°, and twist films of Nos. 3, 4, 7, and 8 twist films rotate the polarization axis of linearly polarized light by +45°.

TABLE 3

| | | Second embodiment: Configuration example 1 Combination No. | | | | | | | |
|---|---|---|---|---|---|---|---|---|---|
| | | 1 | 2 | 3 | 4 | 5 | 6 | 7 | 8 |
| Second linear polarizer | Transmission axis azimuth (°) | 135 | 135 | 45 | 45 | 135 | 135 | 45 | 45 |
| Viewing angle control cell | Tilt azimuth (°) | 180 | 180 | 180 | 180 | 180 | 180 | 180 | 180 |
| Twist film | Emission side slow axis azimuth (°) | 135 | 45 | 45 | 135 | 135 | 45 | 45 | 135 |
| | Incident side slow axis azimuth (°) | 180 | 90 | 0 | 90 | 180 | 90 | 0 | 90 |
| | Average slow axis azimuth (°) | 157.5 | 67.5 | 22.5 | 112.5 | 157.5 | 67.5 | 22.5 | 112.5 |
| First linear polarizer | Transmission axis azimuth (°) | 90 | 90 | 90 | 90 | 0 | 0 | 0 | 0 |

Configuration Example 2

FIG. 6 is a perspective view showing a schematic configuration of a display device 202 of configuration example 2 according to the second embodiment.

In the display device 202 of FIG. 6, a first linear polarizer 122 and a second linear polarizer 138 are arranged such that absorption axes A1 and A2 thereof form an angle of 45°, that is, transmission axes B1 and B2 thereof form an angle of 45°. In the example, the right direction in the lateral direction in the drawing is defined as an azimuth of 0°, the left direction is defined as an azimuth of 180°, and the absorption axis A1 of the first linear polarizer 122 coincides with the lateral direction. The azimuth of the transmission axis of the second linear polarizer 138 in the configuration example 2 is different from the azimuth of the transmission axis of the second linear polarizer 128 in the configuration example 1 by 90°. That is, here, the first linear polarizer 122 and the second linear polarizer 138 are arranged such that the transmission axis B1 has an azimuth of 90° and the transmission axis B2 has an azimuth of 45°.

An optically anisotropic layer 134 is a twist film in which the azimuth of an incident slow axis D1 is 180°, the azimuth of an emission slow axis D2 is 135°, and the azimuth of an average slow axis D is 157.5° as in the configuration example 1. The twist film 134 rotates the polarization axis of the linearly polarized light emitted from the first linear polarizer 122 by −45°. Therefore, the linearly polarized light having the polarization axis at an azimuth of 90° and transmitted through the transmission axis at an azimuth of 90° is converted into an azimuth of 45°. That is, the polarization axis of the light emitted from the optically anisotropic layer 124 toward the viewing angle control cell is parallel to the transmission axis B2 of the second linear polarizer 138.

In the configuration example 2, the viewing angle control cell 136 is arranged such that the tilt azimuth is 0°.

A change in the viewing angle in a case where a viewing angle switching element 131 is turned on and off in a state in which the image display panel displays white will be described.

In a state in which no voltage is applied to the viewing angle control cell 136 (0 V), the liquid crystal molecules in the viewing angle control cell 136 are substantially vertically aligned. Since the retardation is not generated in the front and the retardation is small even in the oblique direction when the liquid crystal molecules are vertically aligned, the linearly polarized light emitted from the first linear polarizer 122 is not changed and emitted toward the second linear polarizer 138 as linearly polarized light parallel to the transmission axis of the second linear polarizer 138 as it is. This state is an "OFF" state for viewing angle control. In a case where the voltage is increased from this state to a predetermined value (for example, 3.0 V), the major axis direction of the liquid crystal molecules falls in the tilt azimuth and obliquely tilted, and thus the retardation is larger in an azimuth forming an angle of 180° with the tilt azimuth than in other azimuths. In the direction in which the retardation is large, the transmittance is lower than in the other directions, resulting in a black state, and the viewing angle control is an "ON" state. Since the tilt azimuth P of the viewing angle control cell is set to 0° in the configuration example 2, a change in transmittance due to ON/OFF switching becomes the largest at an azimuth of 180°. As a result, switching of the viewing angle at an azimuth of 180° is realized.

Figure 7:
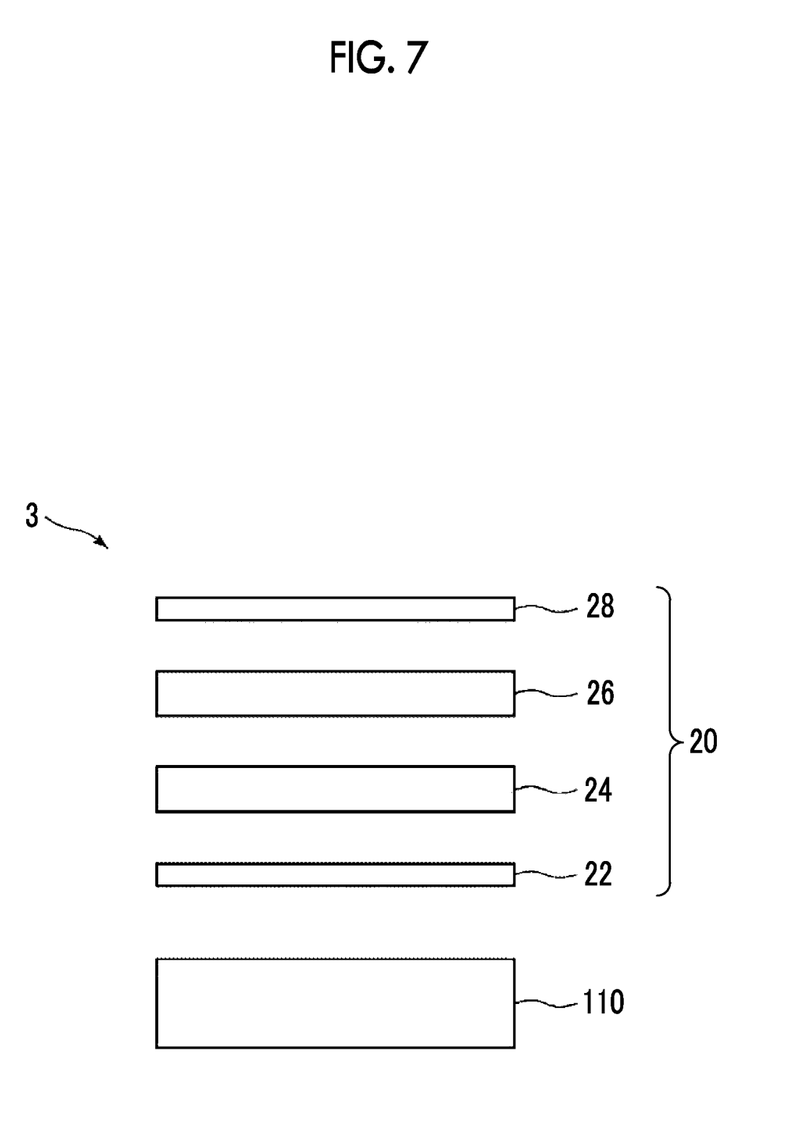
FIG. 7 is a view showing a schematic configuration of a display device of a design change example.

In the above description, an example in which the transmission axis of the first linear polarizer has an azimuth of 90°, the transmission axis of the second linear polarizer has an azimuth of 45°, the average slow axis azimuth of the twist film is 157.5°, and the tilt azimuth of the viewing angle control cell is 0° will be described. However, the present invention is not limited to the above combination, and other combinations of the transmission axis of the first polarizer, the transmission axis of the second polarizer, the incident slow axis and the emission slow axis of the twist film, and the tilt azimuth of the viewing angle control cell satisfying the requirements of the second embodiment may be adopted. The configuration example 2 and combinations Nos. 1 to 8 of the axial azimuths of each element having the same operation and effect as the configuration example 2 are shown in Table 4.

disclosure may be a display device 3 including an OLED as an image display panel 110, and a viewing angle switching element 20 including a first linear polarizer 22, an optically anisotropic layer 24, a viewing angle control cell 26, and a second linear polarizer 28 on a light emission surface side of the OLED.

In the embodiment, the configuration in which the display device includes the viewing angle switching element 20 on the visible side of the display panel has been described, but in a case where the image display panel is an LCD, the viewing angle switching element may be provided on the side opposite to the visible side of the image display panel, that is, on the LCD backlight side. Even in a case where the viewing angle switching element 20 is provided on any surface side of the display panel, the same effect as the above configuration can be obtained.

In addition, in the embodiment, the first and second linear polarizers have described as absorption type polarizers. However, either or both of the first and second linear polarizers may be a reflection type polarizer. One may be an absorption type polarizer, and the other may be a reflection type polarizer. In addition, at least one of the linear polarizers may have a laminated structure of an absorption type polarizer and a reflection type polarizer. A reflection type polarizer is suitably used when the light is recycled. In a case where the image display panel is an LCD, the viewing angle switching element may be arranged on the side opposite to the visible side of the image display panel, that is, the backlight side, the second linear polarizer may be a reflection type polarizer, and the first linear polarizer may be a lamination type of a reflection type polarizer and an absorption type polarizer. By adopting such a configuration, it is possible to achieve both backlight light recycling and image display panel display quality (contrast and the like).

As the linear polarizer used as the first linear polarizer and the second linear polarizer, known linear polarizers can be used and for example, a polyvinyl alcohol (PVA) iodine polarizer may be used. However, there is no limitation thereto.

TABLE 4

| | | Second embodiment: Configuration example 2 Combination No. | | | | | | | |
|---|---|---|---|---|---|---|---|---|---|
| | | 1 | 2 | 3 | 4 | 5 | 6 | 7 | 8 |
| Second linear polarizer | Transmission axis azimuth (°) | 45 | 45 | 135 | 135 | 45 | 45 | 135 | 135 |
| Viewing angle control cell | Tilt azimuth (°) | 0 | 0 | 0 | 0 | 0 | 0 | 0 | 0 |
| Twist film | Emission side slow axis azimuth (°) | 135 | 45 | 45 | 135 | 135 | 45 | 45 | 135 |
| | Incident side slow axis azimuth (°) | 180 | 90 | 0 | 90 | 180 | 90 | 0 | 90 |
| | Avergae slow axis azimuth (°) | 157.5 | 67.5 | 22.5 | 112.5 | 157.5 | 67.5 | 22.5 | 112.5 |
| First linear polarizer | Transmission axis azimuth (°) | 90 | 90 | 90 | 90 | 0 | 0 | 0 | 0 |

In each of the above embodiments, the case where the image display panel is a liquid crystal panel has been described. However, the image display panel is not limited to a liquid crystal panel and may be an organic light emitting diode (OLED) or a printed material. In a case where the image display panel is an OLED or a printed material, since there is no linear polarizer on the light emission surface, the viewing angle switching element 20 may have the first linear polarizer independent of the image display panel. That is, as shown in FIG. 7, a display element according to the present

EXAMPLES

Example 1

Preparation of Viewing Angle Control Cell

Two glass substrates with indium tin oxide (ITO) electrodes having a thickness of 0.7 mm were prepared and on the ITO surface side, a vertical alignment material for liquid crystals SE-1211 (manufactured by Nissan Chemical Industries Ltd.) was applied and fired by heating to form an alignment film. Then, an alignment treatment by rubbing was performed. Thereafter, the alignment films of the two substrates faced to each other and overlapped through a spacer so that the alignment treatment directions were antiparallel, thereby preparing a cell. A liquid crystal material with negative dielectric anisotropy MLC-2039 (manufactured by Merck) was injected into this cell to prepare a viewing angle control cell.

As a result of measuring the Δnd, which is birefringence, and the tilt angle of the viewing angle control cell using Axoscan manufactured by Axometrics Inc., it was confirmed that Δnd was 330 nm, the tilt angle was 89°, and the viewing angle control cell was an almost vertical alignment cell. In addition, the transmittance in a case where this cell was interposed between crossed Nicol polarizers and a voltage was applied was examined. In a case where no voltage was applied, it was confirmed that the front transmittance was approximately zero, but the transmittance increased as the voltage increased. In addition, it was confirmed that the transmittance in the in-plane azimuth of the tilt angle was smaller than that in the in-plane azimuth that was 180 degrees different from the tilt azimuth, and the liquid crystals fell in a single direction in a case where a voltage was applied. The azimuth in which the liquid crystals fall as described above is a tilt azimuth.

Preparation of Polarizing Plate

A linear polarizer formed of a polyvinyl alcohol film was prepared by adsorbing iodine onto a stretched polyvinyl alcohol film. The polarization degree was 99.997. Next, a commercially available cellulose triacetate film (FUJITAC TD80UF, manufactured by Fujifilm Corporation) was saponified in the same manner and bonded to the other surface of the linear polarizer using a polyvinyl alcohol-based adhesive as a protective film, and thus a linearly polarizing plate was prepared. This polarizing plate was used as a second linear polarizer.

Optically Anisotropic Layer: Preparation of λ/2 Plate

A λ/2 plate was prepared as an optically anisotropic layer. A λ/2 plate was prepared by laminating two λ/4 plates formed of polycarbonate (Pure Ace T-138 manufactured by Teijin Limited) using SK Dyne 2057 manufactured by Soken Chemical Co., Ltd. such that the slow axes were parallel to each other.

Preparation of Viewing Angle Switching Control Device

A liquid crystal monitor LP2065 manufactured by Hewlett Packard Enterprise Company was prepared as an image display panel. This liquid crystal monitor includes a backlight side polarizing plate, a liquid crystal cell for display, and a visible side polarizing plate, the absorption axis azimuth of the visible side polarizing plate is a lateral direction, and the absorption axis azimuth of the backlight side polarizing plate is a vertical direction. A display device of Example 1 including the visible side polarizer of the liquid crystal monitor used as the first linear polarizer, and a viewing angle switching element in which an optically anisotropic layer (λ/2 plate), a viewing angle control cell, and a linearly polarizing plate were laminated in this order on the first linear polarizer using a pressure sensitive adhesive (SK Dyne 2057 manufactured by Soken Chemical & Engineering Co., Ltd.) was prepared. The support surface of the optically anisotropic layer was laminated so as to face the viewing angle control cell. Each member was laminated such that the tilt azimuth of the viewing angle control cell, the azimuth of the slow axis of the optically anisotropic layer, and the azimuth of the transmission axis of the linearly polarizing plate were the directions as shown in Table 1, respectively. The display device of Example 1 has the same laminated structure as that of the configuration example 1 of the first embodiment shown in FIG. 2, and has a configuration in No. 3 of Table 1.

Comparative Example 1

A display device having a configuration in which the optical compensation sheet was excluded from Example 1 was prepared as Comparative Example 1.

Example 2

A viewing angle control cell, a polarizing plate, and an optical optically anisotropic layer were prepared in the same manner as in Example 1 and a liquid crystal monitor LP2065 manufactured by Hewlett Packard Enterprise Company was prepared as an image display panel. In addition, a display device of Example 2 including a viewing angle switching element in which a viewing angle control cell, an optical compensation sheet, and a linearly polarizing plate were laminated in this order on the visible side polarizer of the liquid crystal monitor using a pressure sensitive adhesive (SK Dyne 2057 manufactured by Soken Chemical & Engineering Co., Ltd.) was prepared as in Example 1. Each member was laminated such that the tilt azimuth of the control cell, the azimuth of the slow axis of the optically anisotropic layer, and the azimuth of the transmission axis of the linearly polarizing plate were the directions as shown in Table 1, respectively. The display device of Example 2 has the same laminated structure as that of the configuration example 2 of the first embodiment shown in FIG. 3 and has a configuration shown in No. 3 of Table 2.

Comparative Example 2

In Example 2, a display device having a configuration in which the azimuth of the slow axis of the optically anisotropic layer was 0° was prepared as Comparative Example 2.

Evaluation

Regarding each prepared device, a test image was displayed on the image display cell, in a wide viewing angle state (OFF) in the left direction (an azimuth of 180°) and the right direction (an azimuth of 0°) and in a narrow viewing angle state (ON) only in the left direction while leaving the wide viewing angle state in the right direction in the viewing angle control cell, the display brightness was visually evaluated from three directions of a front direction (normal N direction), a right direction (an azimuthal angle of 0°) and a 45° direction (a polar angle of 45°) with respect to the normal line, and a left direction (an azimuthal angle of 180°) and a 45° direction (a polar angle of 45°) with respect to the normal line. The voltages applied in the OFF state and the ON state were as shown in Table 5, respectively.

The evaluation is as follows.
A: The brightness is bright and the display is visually recognized.
B: The brightness is slightly dark but the display is visually recognized.
S: The brightness is dark and the display is not visually recognized.

TABLE 5

| | | | Comparative Example 1 | Example 1 | Comparative Example 2 | Example 2 |
|---|---|---|---|---|---|---|
| Configuration of viewing angle switching element | Second linear polarizer | Transmission axis azimuth (°) | 45 | 45 | 135 | 135 |
| | Viewing angle control cell | Tilt azimuth (°) | 180 | 180 | 0 | 0 |
| | | Applied voltage in OFF state | 5 V | 5 V | 0 V | 0 V |
| | | Applied voltage in ON state | 3.4 V | 3.4 V | 3.0 V | 3.0 V |
| | Optically anisotropic layer | Slow axis azimuth (°) | None | 22.5 | 0 | 22.5 |
| | First linear polarizer | Transmission axis azimuth (°) | 90 | 90 | 90 | 90 |
| Effect: brightness evaluation | Front | At OFF | A | A | A | A |
| | | At ON | A | A | A | A |
| | Right (azimuth 0°), Polar angle 45° | At OFF | A | A | A | A |
| | | At ON | A | A | A | A |
| | Right (azimuth 180°), Polar angle 45° | At OFF | A | A | A | A |
| | | At ON | B | S | B | S |

As shown in Table 5, it is found that in Examples 1 and 2, the brightness from the left direction at the time of ON was low compared to Comparative Examples 1 and 2, and the viewing angle could be switched only in the left direction. The effects of the present invention have been clarified by this founding.

Even in a case where a twist film is provided in place of the λ/2 plate, the function as a viewing angle switching element is almost the same, and thus it is considered that the same evaluation as in Examples above can be obtained.

The present invention can be suitably used as a display device for a tablet PC, a laptop PC, and a smartphone, an information display for public use, a display to be mounted on a car, a train and an aircraft, and an industrial display for medical and factory equipment.

The entire disclosure of Japanese Patent Application No. 2017-227036 field on Nov. 27, 2017 is hereby incorporated herein by reference.

All documents, patent applications, and technical standards described herein are incorporated herein by references to the same extent as a case in which incorporation of the individual reference documents, patent applications, and technical standards by references are described specifically and individually.

What is claimed is:

1. A display device comprising:
an image display panel; and
a viewing angle switching element that is arranged on a display surface side of the image display panel and changes a viewing angle,
wherein the viewing angle switching element includes a first linear polarizer, an optically anisotropic layer, a viewing angle control cell, and a second linear polarizer arranged in order from an image display panel side,
an angle formed between transmission axes of the first linear polarizer and the second linear polarizer is 45°,
the optically anisotropic layer has a function of changing an azimuth of a polarization axis of linearly polarized light emitted from the first linear polarizer to an azimuth forming an angle of 45° with the azimuth of the polarization axis and causing the light to be emitted toward the viewing angle control cell, and
the viewing angle control cell is formed of a vertically aligned liquid crystal cell in which vertically aligned liquid crystals are tilted in one direction by voltage application, and an angle formed between a tilt azimuth of the vertically aligned liquid crystal of the viewing angle control cell and the transmission axis of the second linear polarizer is 45°.

2. The display device according to claim 1,
wherein the optically anisotropic layer changes the polarization axis of linearly polarized light emitted from the first linear polarizer to an azimuth orthogonal to the transmission axis of the second linear polarizer to cause emit the light to be emitted toward the viewing angle control cell, and
the viewing angle switching element changes the viewing angle in the tilt azimuth of the vertically aligned liquid crystal of the viewing angle control cell.

3. The display device according to claim 2,
wherein the viewing angle is changed by switching an alignment state of the vertically aligned liquid crystal of the vertically aligned liquid crystal cell between an oblique alignment in which the liquid crystal is obliquely tilted in the tilt azimuth and a horizontal alignment with a polar angle of 90°.

4. The display device according to claim 1,
wherein the optically anisotropic layer changes the polarization axis of linearly polarized light emitted from the first linear polarizer to an azimuth parallel to the transmission axis of the second linear polarizer to cause the light to be emitted toward the viewing angle control cell, and
the viewing angle switching element changes the viewing angle in an azimuth that forms 180° with the tilt azimuth of the vertically aligned liquid crystal of the viewing angle control cell.

5. The display device according to claim 4,
wherein the viewing angle is changed by switching an alignment state of the vertically aligned liquid crystal of the vertically aligned liquid crystal cell between a vertical alignment with a polar angle of 0° and an oblique alignment in which the liquid crystal is obliquely tilted in the tilt azimuth.

6. The display device according to claim 1,
wherein the optically anisotropic layer is a λ/2 plate.

7. The display device according to claim 1,
wherein the optically anisotropic layer is a film that rotates the polarization axis of the linearly polarized light emitted from the first linear polarizer by 45° to cause the light to be emitted toward the viewing angle control cell.

8. The display device according to claim 1,
wherein the image display panel includes a liquid crystal cell for display, and two linear polarizers that are arranged to face to each other with the liquid crystal cell for display interposed therebetween, and
one of the two linear polarizers functions as the first linear polarizer of the viewing angle switching element.

* * * * *